(No Model.) 9 Sheets—Sheet 1.

F. S. COOK, Dec'd.
J. W. COOK, Administrator.
BOLT THREADING MACHINE.

No. 492,140. Patented Feb. 21, 1893.

Witnesses
Arthur Johnson
M. Chamberlin

Jerome W. Cook
administrator of the estate
of the Inventor
Frank S. Cook
deceased
By his Attorney
Walter H. Chamberlin

(No Model.) 9 Sheets—Sheet 2.

F. S. COOK, Dec'd.
J. W. Cook, Administrator.
BOLT THREADING MACHINE.

No. 492,140. Patented Feb. 21, 1893.

Witnesses
Arthur Johnson
M. Chamberlin.

Jerome W. Cook
administrator of the Estate of the inventor
Frank S. Cook deceased
By his Attorney
Walter H. Chamberlin (No Model.) 9 Sheets—Sheet 3.

F. S. COOK, Dec'd.
J. W. Cook, Administrator.
BOLT THREADING MACHINE.

No. 492,140. Patented Feb. 21, 1893.

Witnesses
Arthur Johnson
M. Chamberlin.

Jerome N. Cook
administrator of the
Estate of the
Inventor
Frank S. Cook,
deceased By his Attorney
Walter H. Chamberlin

THE NORRIS PETERS CO., PHOTO-LITHO., WASHINGTON, D. C.

(No Model.) 9 Sheets—Sheet 4.

F. S. COOK, Dec'd.
J. W. Cook, Administrator.
BOLT THREADING MACHINE.

No. 492,140. Patented Feb. 21, 1893.

Witnesses
Arthur Johnson
M. Chamberlin

Jerome N. Cook
administrator of the Estate
of the Inventor
Frank S. Cook
deceased By his Attorney
Walter H. Chamberlin

THE NORRIS PETERS CO., PHOTO-LITHO., WASHINGTON, D. C.

(No Model.)  
9 Sheets—Sheet 5.

F. S. COOK, Dec'd.
J. W. Cook, Administrator.
BOLT THREADING MACHINE.

No. 492,140.  
Patented Feb. 21, 1893.

Witnesses  
Arthur Johnson  
M. Chamberlin

Inventor  
Frank S. Cook  
deceased  
Jerome W. Cook  
Administrator of the estate of the  
By his Atty  
Walter N. Chamberlin (No Model.) 9 Sheets—Sheet 6.

F. S. COOK, Dec'd.
J. W. Cook, Administrator.
BOLT THREADING MACHINE.

No. 492,140. Patented Feb. 21, 1893.

Witnesses
Arthur Johnson
M. Chamberlin.

Jerome W. Cook
administrator of the Estate of
the Inventor;
Frank S. Cook
deceased
By Walter H. Chamberlin
Atty.

(No Model.) 9 Sheets—Sheet 7.
F. S. COOK, Dec'd.
J. W. Cook, Administrator.
BOLT THREADING MACHINE.

No. 492,140. Patented Feb. 21, 1893.

Witnesses.
Arthur Johnson
M. Chamberlin

Jerome W. Cook
Administrator of the
Estate of the
Inventor.
Frank S. Cook,
deceased
By his Atty.
Walter H. Chamberlin

THE NORRIS PETERS CO., PHOTO-LITHO., WASHINGTON, D. C.

(No Model.) 9 Sheets—Sheet 8.

F. S. COOK, Dec'd.
J. W. Cook, Administrator.
BOLT THREADING MACHINE.

No. 492,140. Patented Feb. 21, 1893.

Jerome N. Cook
Administrator of the Estate
of the Inventor
Frank S. Cook
deceased By his Attorney
Walter H. Chamberlin Witnesses
Arthur Johnson
M. Chamberlin (No Model.) 9 Sheets—Sheet 9.

F. S. COOK, Dec'd.
J. W. Cook, Administrator.
BOLT THREADING MACHINE.

No. 492,140. Patented Feb. 21, 1893.

Witnesses.
Arthur Johnson
M. Chamberlin

Jerome W. Cook
administrator of the Estate
of the Inventor:
Frank S. Cook
deceased By his Attorney.
Walter H. Chamberlin

UNITED STATES PATENT OFFICE.

JEROME W. COOK, OF SPRINGFIELD, OHIO, ADMINISTRATOR OF FRANK S. COOK, DECEASED, ASSIGNOR TO THE CAPITOL MANUFACTURING COMPANY, OF CHICAGO, ILLINOIS.

BOLT-THREADING MACHINE.

SPECIFICATION forming part of Letters Patent No. 492,140, dated February 21, 1893.

Application filed September 18, 1891. Serial No. 406,095. (No model.)

*To all whom it may concern:*

Be it known that I, JEROME W. COOK, (administrator of the estate of FRANK S. COOK, deceased,) a citizen of the United States, residing at Springfield, in the county of Clark, State of Ohio, believe that said FRANK S. COOK did invent a certain new and useful Improvement in Bolt-Threading Machines; and I declare the following to be a full, clear, and exact description of the same, such as will enable others skilled in the art to which it pertains to make and use the same, reference being had to the accompanying drawings, which form a part of this specification.

This invention is designed as an improvement on the apparatus shown and described in the patents to Adams Nos. 318,678 and 357,300 and it consists primarily in mounting each cutting die in an independent carrier, and second in making the die carriers and dies universally or simultaneously adjustable so as to thread bolts or rods of various diameters.

It also consists in other features hereinafter described and claimed.

In the drawings: Fig. 29—is a side elevation with parts in section of those parts shown in Fig. 28. Figs. 30—31— and 32—are views illustrating the mechanism for clamping the lead screw. Fig. 33—is a detail view of the rack bar.

In carrying out the invention the main structure of the machine which is similar to that employed in the above mentioned patents will first be described.

A represents the bed of the machine provided with the driving shaft B the latter provided with suitable band wheels B'.

C is an auxiliary shaft preferably hollow, provided with the gear C' which meshes with the gear B² on the main shaft. To the shaft C is engaged the cutting die head or chuck.

Figure 1:
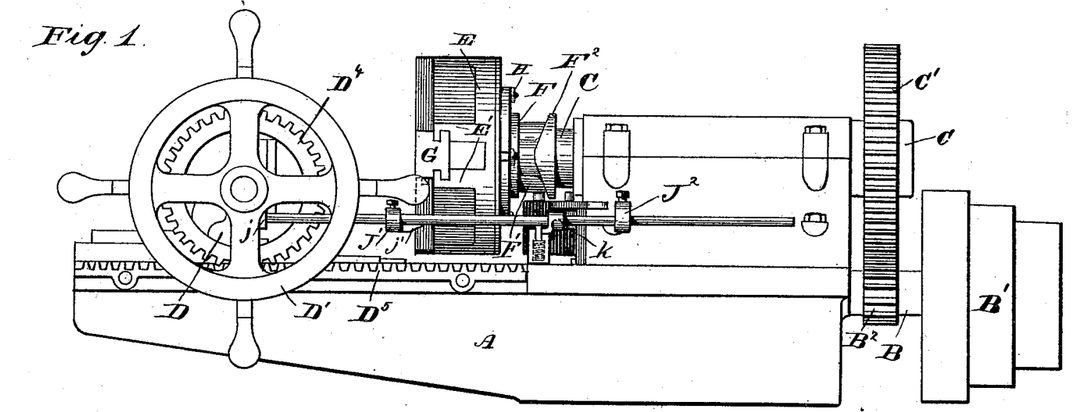
Figure 1—is a side elevation of a machine embodying this invention.
Figure 2:
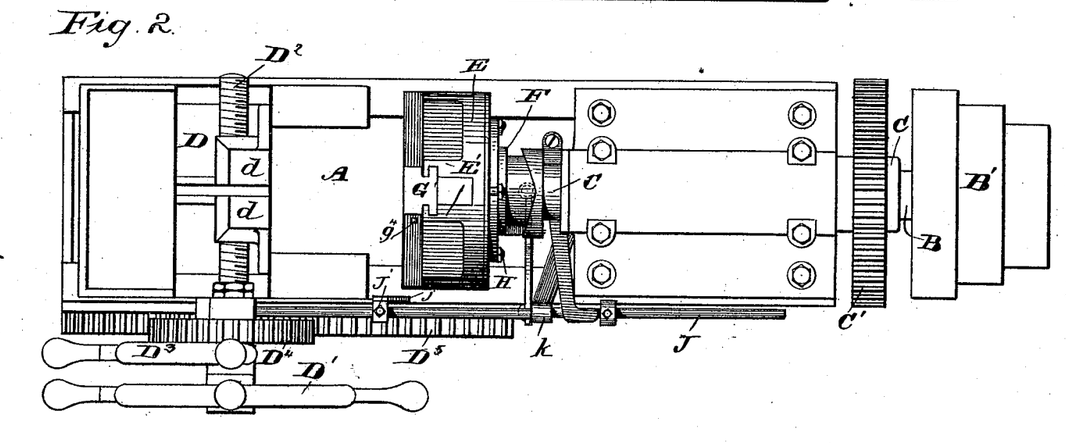
Fig. 2—is a plan view of the same.
Figure 3:
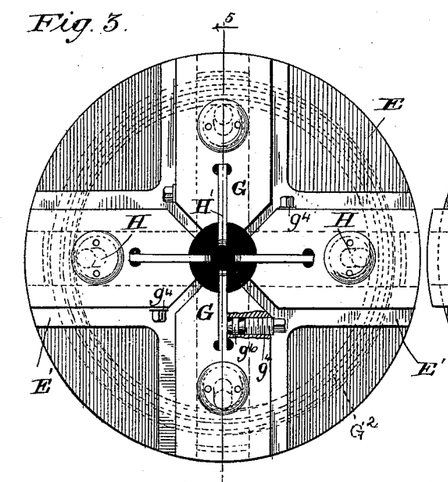
Fig. 3—is an end elevation of the head or chuck with the dies closed or in cutting position.
Figure 4:
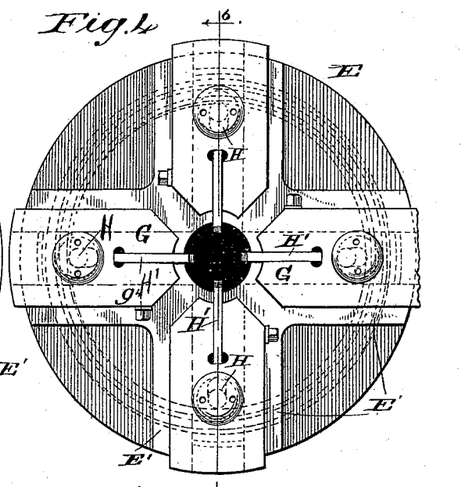
Fig. 4—is a similar view with the dies open.

In Figs. 1 and 2—is shown a bolt carriage of similar construction to that employed in the Adams patents.

D is the carriage mounted on suitable ways on the bed plate, provided with jaws $d$ which clamp the bolt, the jaws being operated by the wheel D' and screw shaft D², and the carriage being moved forward or back by the hand wheel D³ pinion D⁴ and stationary rack bar D⁵.

The construction of the die head or chuck will now be described.

Figures 7, 8, 9, 10, 11, 12, 13, 14:
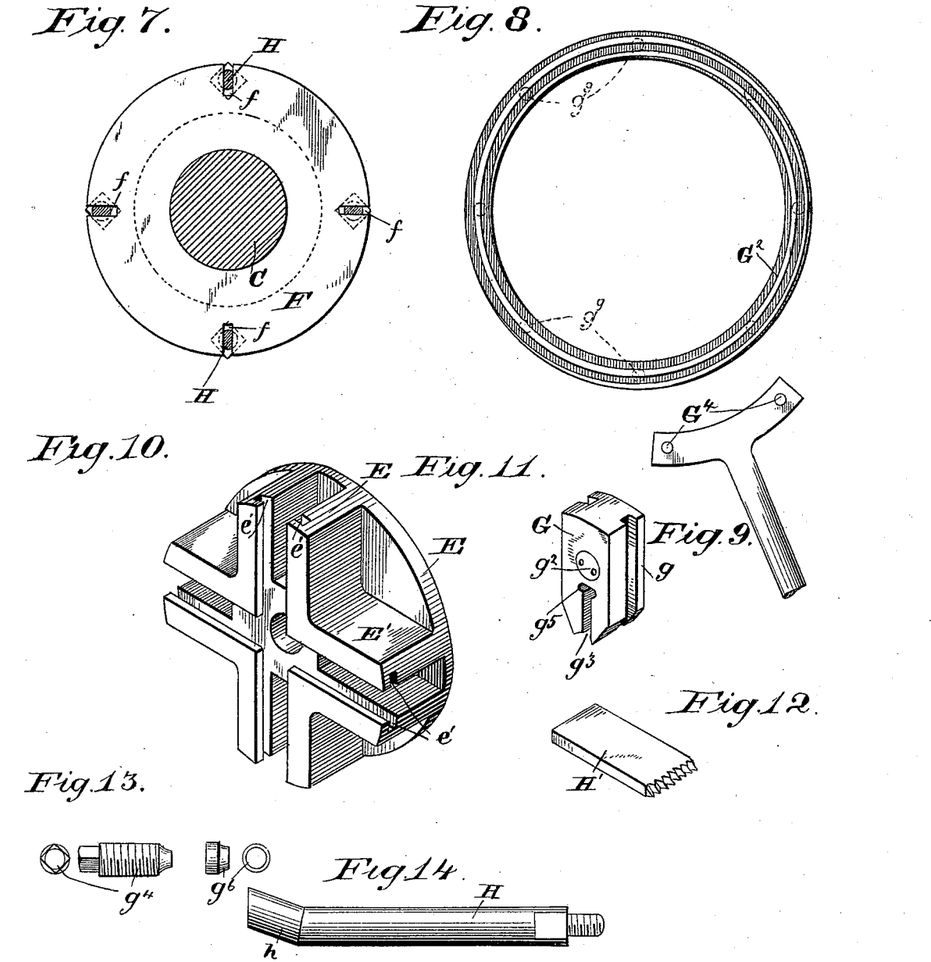
Fig. 7—is a cross section of the chuck on the line 7—7 of Fig. 6.
Fig. 8—is a view of the adjusting ring.
Fig. 9—is a view of the spanner which may be used to operate the adjusting ring.
Fig. 10—is a view of the main chuck block to which the operative parts are engaged.
Fig. 11—is a detail view of the die carrier.
Fig. 12—is a detail view of one of the dies.
Fig. 13—is a view of the set screw and its accompanying cap used to hold the die in the carrier.
Figs. 14 and 15—are elevations of the keys or pins employed to move the die carriers.

E represents the main block or head of the chuck or that portion to which the operative parts of the chuck are engaged. (Shown in detail in Fig. 10.) It is screwed or otherwise rigidly engaged to the shaft C as at $c$ and is provided with the slots $e$.

F is a ring or collar engaged to the shaft C back of the head E, and movable on the shaft, and it is provided with the slots $f$. The flanges E' of the head block E are provided with grooves $e'$.

G are the blocks which directly carry the cutting dies (Fig. 11) and will be hereinafter termed the "die carriers."

G' are intermediate blocks located between the blocks G and the head E and will hereinafter be termed the "adjusting blocks." Flanges $g$ on the carriers G engage the grooves $e'$.

H are keys or pins by means of which the carriers G and blocks G' are held in position and by means of which the former are operated to open and close the dies. These keys extend through the slots $e$ in the head through the blocks G' where a bushing $g'$ is provided and into the carriers G. The end of each key where it enters the carrier is angular as at $h$ and the bushing in the carrier G on which this angular end $h$ bears is correspondingly beveled. A nut $g^2$ covers the opening in the carrier G.

H' are the dies held in the slots $g^3$ of the carriers G by set screws $g^4$. These slots $g^3$ have another slot or recess $g^5$ at their inner ends thus forming what may be termed a T slot. By this formation the dies are easily removed and dirt &c. can be prevented from accumulating, and the inner ends of the dies, be also brought to a firm seat or bearing in the carrier.

Figure 15:
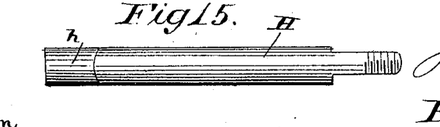
Figures 16, 17:
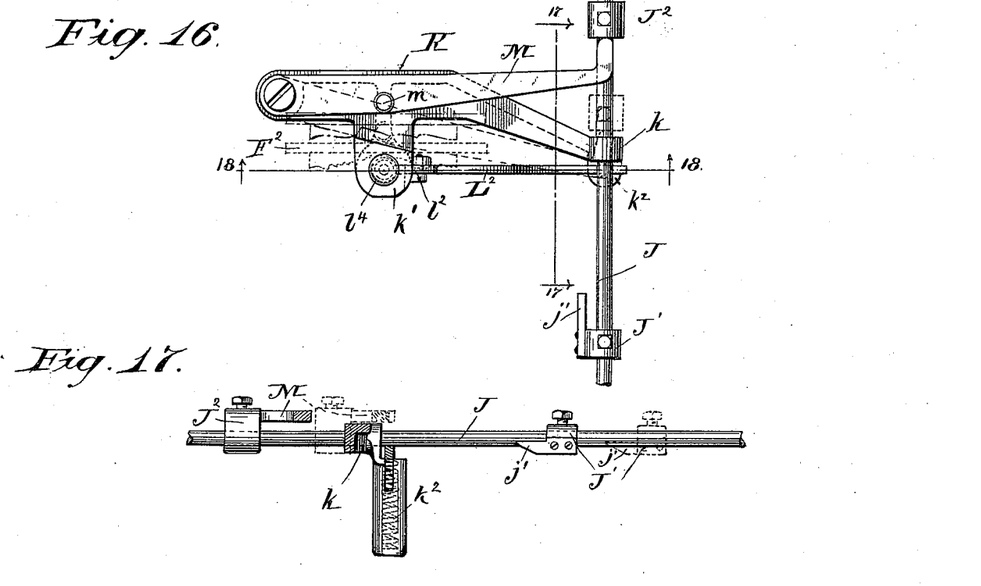
Fig. 16—is a plan view of the parts employed to operate the chuck to open and close the dies.
Fig. 17—is a side elevation on the line 17—17 of Fig. 16.

To prevent the set screw from springing or displacing the die and thus throw the cutting end out of alignment, a loose independent cap $g^6$ is provided which bears directly on the die, the end of the screw bearing on the cap (Figs. 3 to 13). The rear ends of the keys H are flattened (Figs. 14 and 15) so that they will pass through the slots $f$ and are engaged by the nuts $h'$. Each block G' has on what may be termed its surface the spiral threads $g^7$. Meshing with these is the movable spiral threaded ring $G^2$ (Fig. 8) secured to the head by the flat ring $G^3$ and set screws $g^8$. The ring $G^2$ is provided at regular intervals with orifices $g^9$ and by using a spanner (Fig. 9) having pins $G^4$, or other tool, this adjusting ring may be revolved. This revolution acts to move the block G' and with them the carriers G and dies H' either in or out as the case may be. A graduated scale (Fig. 23) may if desired be provided and the dies thus be accurately and universally adjusted to cut any diameter of bolt or rod.

The operation of opening and closing the dies when the machine is in operation is similar to that employed in the Adams patent No. 357,300. The ring or collar F is moved on the shaft by mechanism hereinafter described. This moves the keys longitudinally and the angular heads $h$ coming to a bearing on the beveled bushing in the die carriers, move the latter in or out as the case may be, without disturbing the adjusting blocks.

A variation in the form of the chuck as shown more particularly in Figs. 21, 22, 23, and 24 will now be described.

Figures 23, 24, 25, 26:
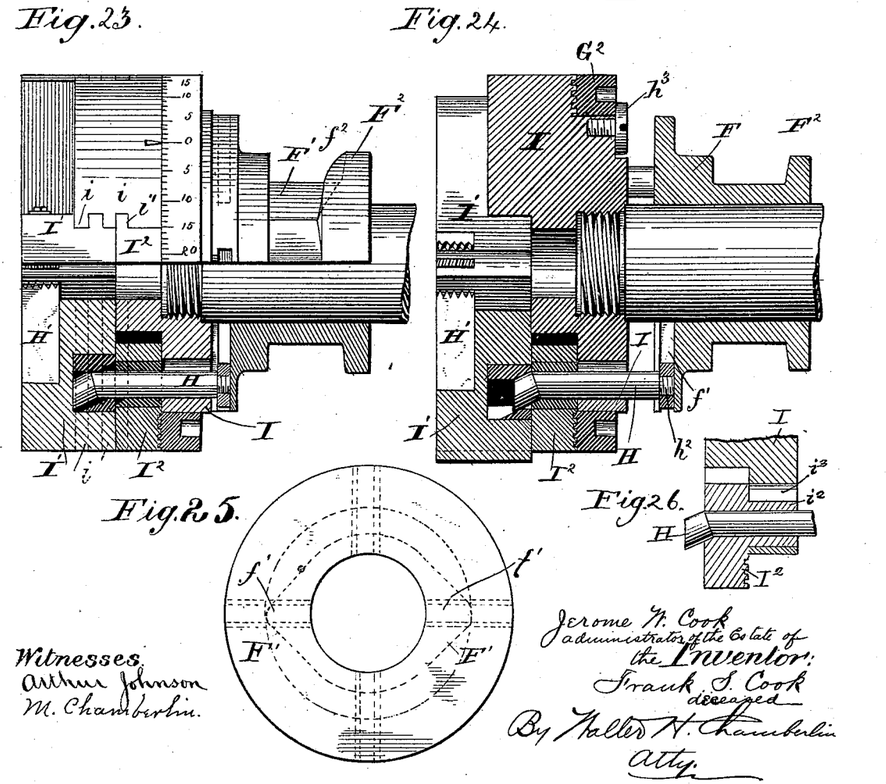
Fig. 23—is a sectional view of Fig. 21.
Fig. 24—is a sectional view of Fig. 22.
Fig. 25—is an end elevation of the collar or ring F.
Fig. 26—is a detail view of a variation in the form of the adjusting block.

The head block I is considerably thicker but of much less diameter than the first described construction and the die carriers I' are also relatively thicker and not so long. The latter are provided with two grooves instead of one in which are engaged the two flanges $i$ of the head block. The adjusting blocks $I^2$ are also provided with tongue and groove engagements with the head block as at $i'$. The block or carrier I' being thicker allows the angular end of the key H to be brought in underneath or behind the dies. If desired the block $I^2$ may be provided with a projecting teat $i^2$ through which the key passes, the teat working in a slot $i^3$ in the head block. In Fig. 24 is also shown a variation in the manner of engaging the end of the key H, to the ring or collar F. The latter is provided with slots $f'$ in which the headed ends $h^2$ of the keys are engaged and in which they slide when the dies are adjusted. In Fig. 24 the adjusting ring $G^2$ is held to the head by screws $h^3$.

The apparatus for moving the ring or flange F to open and close the dies will now be described.

J is a rod rigidly engaged to the carriage D and sliding in bearings $j$—$k$, the latter being on the end of a casting K which is rigidly engaged to the frame of the machine. This casting carries two sockets $k'$—$k^2$.

L is a pin working in the socket $k'$ and provided with a notch or recess $l$. A spring $l'$ exerts a normal pressure upward on the pin. The pin has on its upper end the roller $l^4$.

L' is a lever pivoted to the casting K, the end $l^2$ being adapted to engage in the notch $l$ and the other end projecting out to a point underneath and adjacent to the rod J, a normal pressure being exerted upward on this outer end by the spring $l^3$ in the socket $k^2$.

Figure 5:
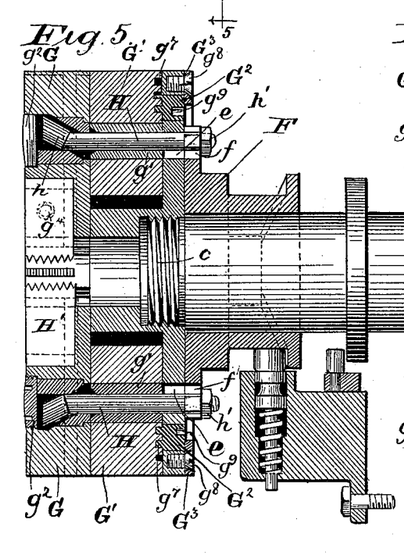
Fig. 5—is a sectional view on the line 5—5 of Fig. 3.
Figure 6:
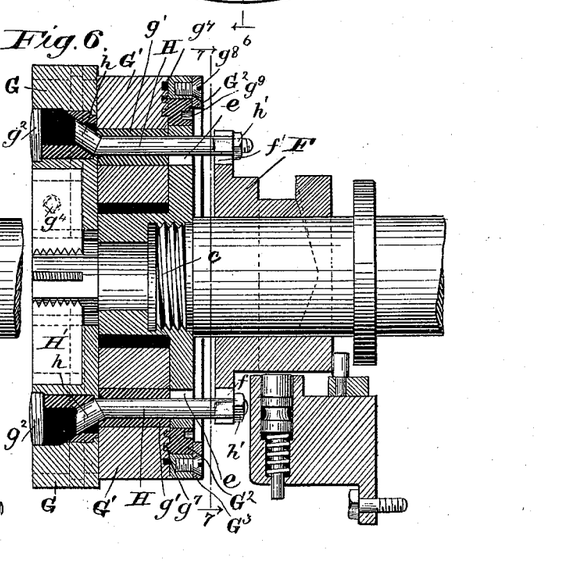
Fig. 6—is a sectional view on the line 6—6 of Fig. 4.
Figure 18:
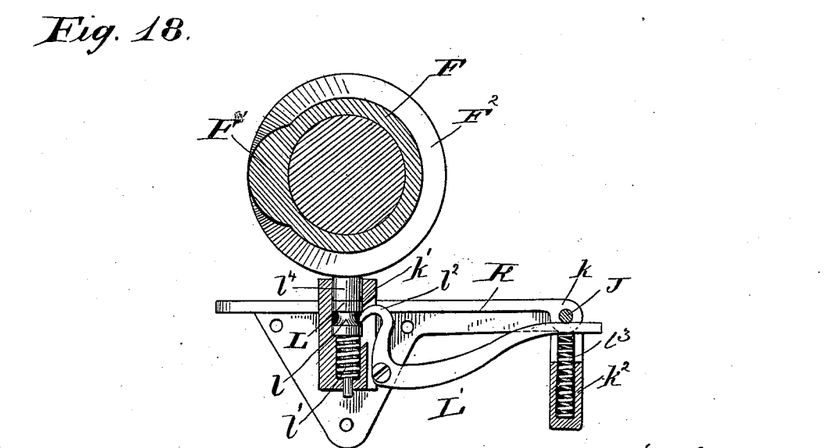
Fig. 18—is a vertical section on the line 18—18 of Fig. 16.

M is another lever pivoted to the casting K and carrying the pin $m$. The periphery of the collar F is provided with one or more cam surfaces F' (Fig. 18) and a flange $F^2$ the latter having inclined or beveled faces or sides $f^2$ (Figs. 5—6—23—and 24). The rod J being rigidly engaged to the carriage, moves therewith, and is provided with the stop block J' having the projection $j'$ beveled on its under surface. This beveled surface coming into contact with the end of the lever L' depresses it. This releases the pin L and the spring $l'$ forces the latter up into the groove in the ring F and coming into contact with the beveled face $f^2$ of the collar F (which is continuously revolving with the shaft and chuck) forces the collar to the right (Figs. 6 and 24).

Difficulty has heretofore been experienced in the use of the pin L as shown in the Adams patent No. 357,300. There is therefore provided the roller $l^4$ which bearing on the beveled face $f^2$ prevents a large amount of the wear between the parts, or the chipping of the ring, and also prevents wearing flat places on the pin. The movement of the collar F as above explained moves the keys H and the angular ends of the keys coming into contact with the beveled bearings in the die carriers move the latter and the dies are thus opened. The carriage is now moved backward by the operator. This relieves the lever L' and within one revolution of the shaft a cam surface F' of the ring F has depressed the pin L and the lever L' has engaged and held it. The rod J is provided with another stop block $J^2$ and this is so arranged on the rod that it will come into contact with the end of the lever M after the pin L has been caught by the lever L'. As the carriage and rod J are drawn back the lever M is thrown by the stop block $J^2$ until the pin $m$ exerts a pressure on the flange $F^2$ and moves the ring or collar F to the right (Fig. 6) to close the dies. It will be seen that by mounting the movable parts of the above described mechanism all on one casting K the construction is greatly simplified and cheapened.

The means whereby the bolt or rod clamping jaws may be automatically operated by the movement of the carriage D will now be described.

Figure 27:
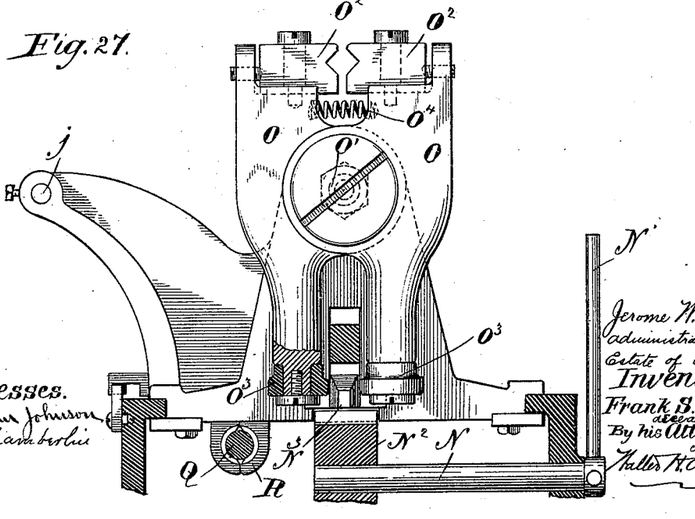
Fig. 27—is an end elevation (with some parts in section) of the machine shown in Figs. 19 and 20.

N (Fig. 27) is a shaft journaled in the frame of the machine and provided with a hand wheel N' by which it may be revolved. On the end of this shaft is the pinion $N^2$ which meshes with the rack bar $N^3$ (shown in detail Fig. 33) movably mounted on the carriage.

O are the jaws which engage the bolt. They are pivoted as at O' and provided with adjustable supplementary jaws $O^2$. On the lower ends of the jaws O are the rollers $O^3$. The end of the rack bar is beveled as at $n$—$n'$—.

Figure 19:
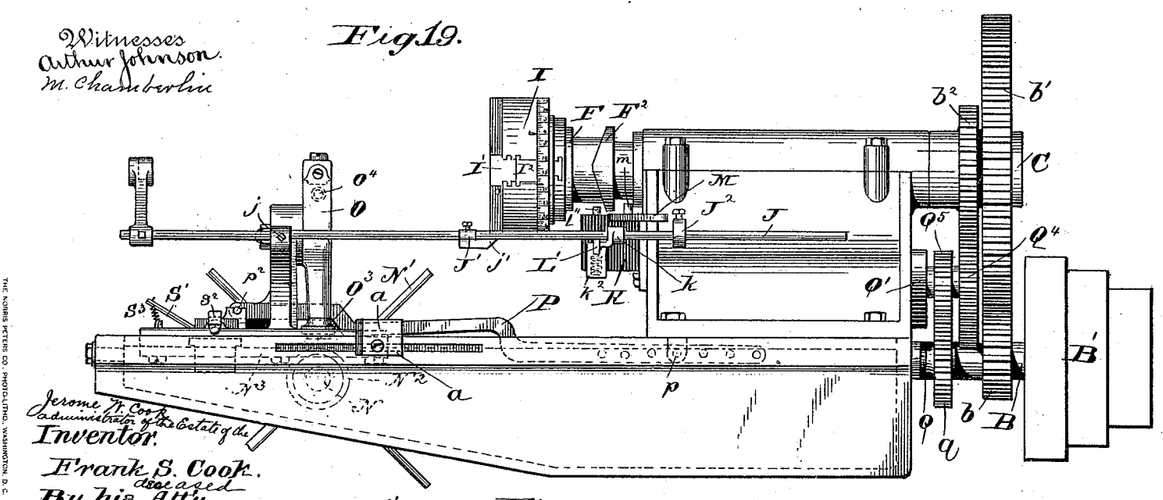
Fig. 19—is a side elevation of the machine in which the chuck is of slightly different construction and in which automatic mechanism is illustrated for clamping the bolt or rod to be threaded.
Figure 20:
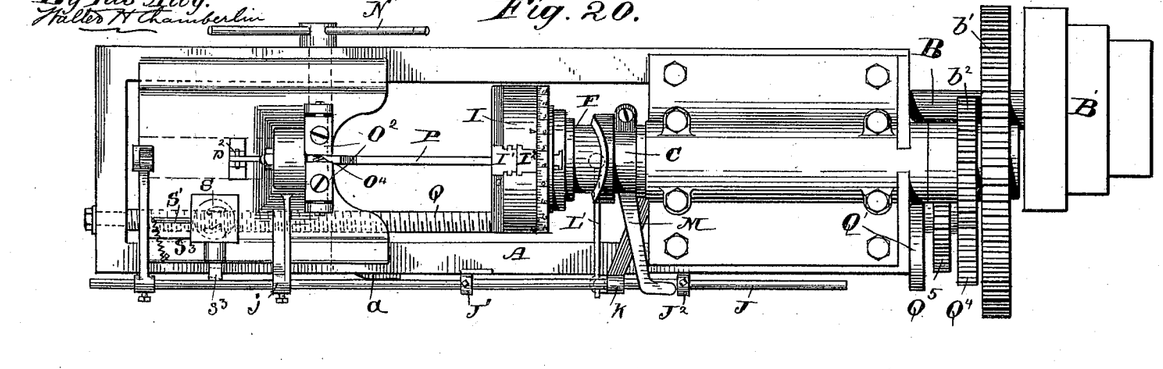
Fig. 20—is a plan view of the same.
Figures 21, 22:
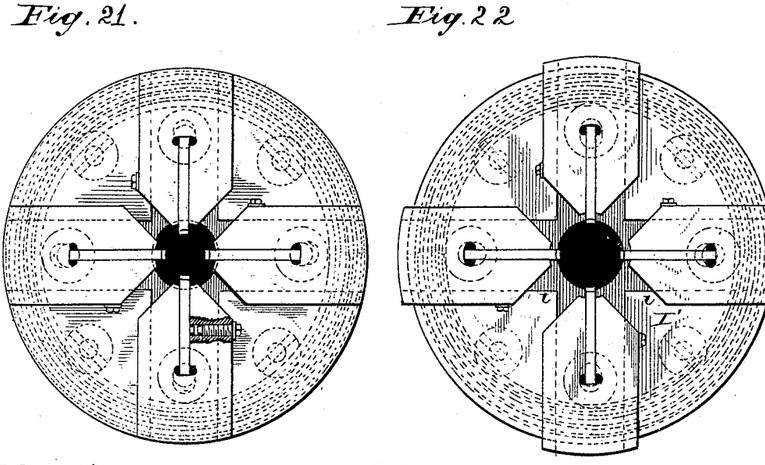
Fig. 21—is an end elevation of a variation in the form of the head or chuck with the dies closed.
Fig. 22—represents the same with the dies open.
Figure 34:
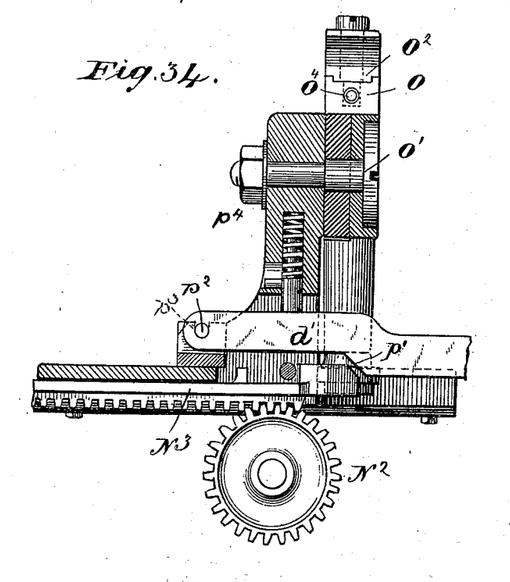
Fig. 34—is an elevation of the jaws.
Figure 35:
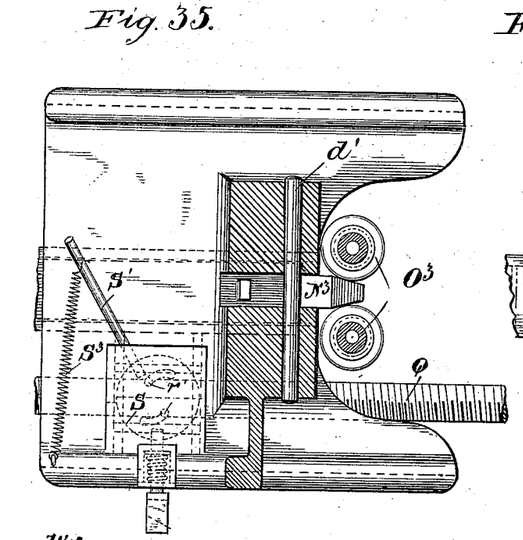
Fig. 35—is a plan view.
Figure 36:
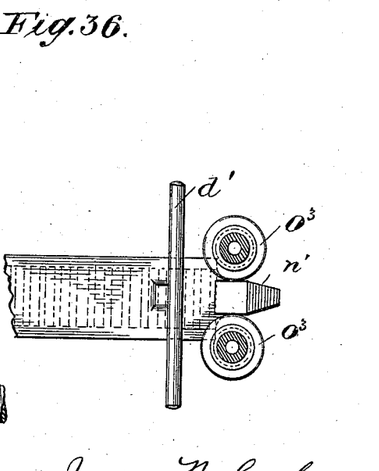
Figs. 36 and 37—are detail views.
Figure 37:
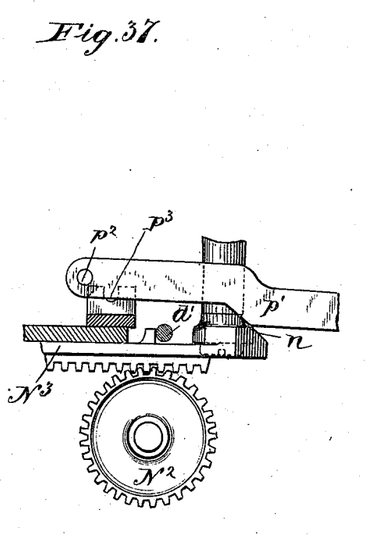

P is a bar pivoted to the frame as at $p$—(Fig. 19) and provided with a number of orifices whereby it may be adjusted to suit the various lengths of bolts or rods to be threaded. This bar has a beveled portion $p'$ (Fig. 34) and on its end a pin $p^2$ which engages in a notch or recess $p^3$ on the carriage. Now a revolution of the hand wheel and pinion $N^2$ moves the rack-bar forward until the beveled end $n$ of the latter enters between the rollers $O^3$ and spreads the lower ends of the jaws apart. This brings the upper ends together and clamps the bolt. At the same time that the bevel faces $n$ come into contact with the rollers $O^3$ and spread them, the bevel $n'$ comes into contact with the bevel portion $p'$ on the bar and lifts the latter so that the pin $p^2$ releases the carriage. A continued revolution of the pinion forces the carriage forward until the dies engage the bolt. As soon as the pinion $N^2$ is revolved in the opposite direction to bring the carriage back, the rack bar is first withdrawn from between the rollers $O^3$ and the spring $O^4$ (Fig. 27) forces the jaws open. When the rack-bar has been withdrawn sufficiently to accomplish this, the end comes in contact with the pin $d'$ on the carriage and the latter is moved back to the starting position where the pin $p^2$ engages in the notch $p^3$. In order that the pin $p^2$ may be held in the notch $p^3$ until intentionally released, there is provided the spring impelled pin $p^4$ (Fig. 34) the end of which bears on the bar P and holds it steadily in position until the beveled face $n'$ on the rack bar forces the bar upward.

As it frequently happens in heavy work that the carriage is not drawn forward or fed properly by the cutting dies engaging the rod or bolt, there is provided an automatic feed for use more particularly on large machines and the same will now be described.

Figure 28:
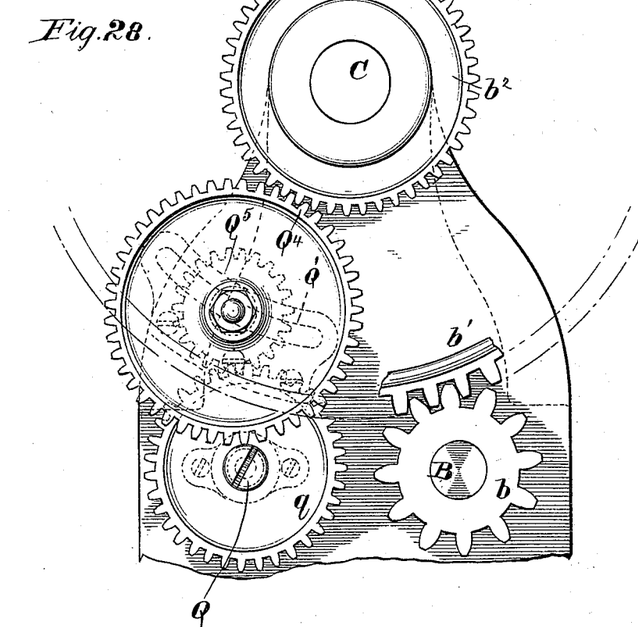
Fig. 28—is an elevation of the opposite end.

The main driving shaft B is placed to one side of the machine (Fig. 28) and is provided with the pinion $b$ which meshes with the pinion $b'$ on the shaft C. On this shaft is also provided the smaller pinion $b^2$ (Fig. 28).

Q is a lead screw extending through the machine to the carriage. On its end is the pinion $q$.

Q' is a slotted brace or support which is engaged to the frame and supports the shaft $Q^2$ by the bolt $Q^3$.

Figures 29, 30, 31, 32, 33:
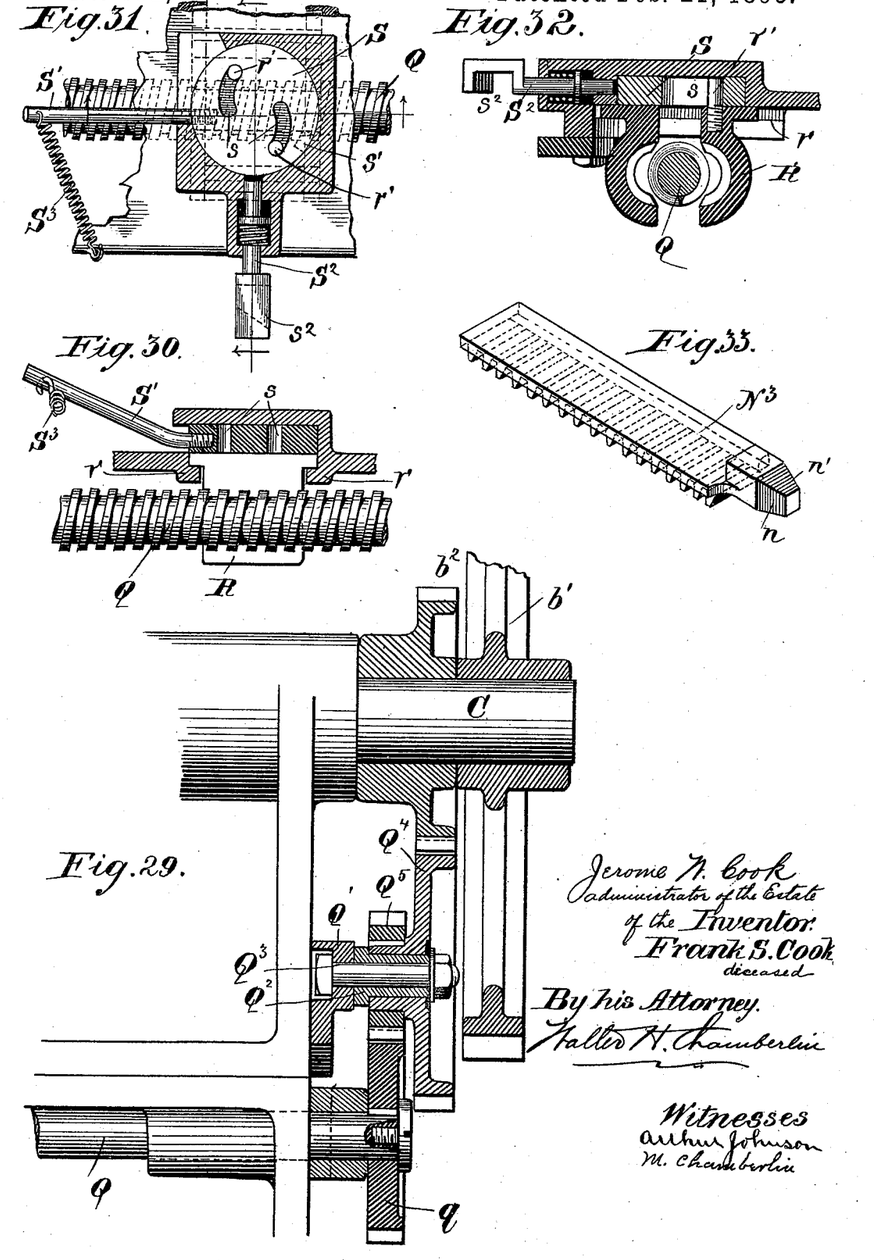

$Q^4$ is a pinion which revolves on the shaft $Q^2$ and to the hub of this pinion $Q^4$ is engaged the pinion $Q^5$. The pinion $Q^4$ meshes with the pinion $b^2$ and the pinion $Q^5$ meshes with the pinion $q$. Motion is thus transmitted to the lead screw. When it is desired to change the speed of the lead screw, the pinions $Q^4$—$Q^5$ may be removed and another set substituted. On the carriage is provided a split nut R supported by suitable ways $r$ (Fig. 30) and from the top of each half of the nut project pins $r'$ which enter eccentric slots $s$ in the plate S (Fig. 31). The plate S is provided with a handle S' and is also provided with a notch or recess $s'$ in its edge as shown by dotted lines Fig. 31. A spring impelled pin $S^2$ enters the notch $s'$ when the plate is oscillated sufficiently. This pin S has a beveled recess in its outer end as at $s^2$. Now when it is desired to engage the carriage to the lead screw, the operator throws the handle or lever S' so as to revolve the plate S. The pins $r'$ working in the slot $s$ draw the two halves of the split nut together and clamp the lead screw. The pin has in the meantime entered the notch $s'$ and holds the parts in this position until the carriage has reached the end of its travel, when a suitably beveled projection $a$ on the frame engages the beveled end $s^2$ of the pin and withdraws the latter from its engagement with the plate S. The tension of the spring $S^3$ which is engaged to the handle S' returns the plate S to its normal position and opens the two halves of the split nut thus automatically releasing the latter from the lead screw.

As will be seen the arrangement of the lead screw is such that if it is not desired to use the same it does not interfere in any way with the operation of the other parts of the machine.

The general operation of the machine briefly described is as follows: The operator places the bolt or rod to be cut between the jaws $d$, revolves the wheel D' and thus clamps it. A revolution of the hand wheel D³ then moves the carriage forward until the end of the bolt enters between the cutting dies of the chuck. The latter is revolving and the bolt and carriage are drawn forward until the desired length of thread is cut. The beveled stop J' then depresses the lever L' thus releasing the pin L, and the latter coming into contact with the beveled face $f^2$ on the collar F, throws the latter and as before explained opens the cutting dies and releases the bolt. The carriage is returned to its position the bolt taken out, a new one placed in and the operation repeated.

What is claimed is—

1. In a bolt threading machine, the combination with a head or chuck, die carriers movably mounted in said head or chuck, adjusting blocks also movably mounted in said head or chuck, the faces of the die carriers and adjusting blocks being in contact, but movable with respect to each other, means for engaging them together, and adjusting mechanism for adjusting them toward or from the center to fit the diameter of the bolt to be threaded, substantially as described.

2. In a bolt threading machine the combination with the die carriers and adjusting blocks, of keys extending through the adjusting blocks and into recesses in the die carriers, said keys provided with angular ends which engage beveled recesses in the die carriers, means for causing the keys to move longitudinally to open and close the dies and adjusting mechanism for moving each die carrier and its adjusting block toward or from the center to fit the diameter of the bolt to be threaded, substantially as described.

3. The combination of the head or chuck the adjusting blocks, the die carriers engaged to the adjusting blocks by keys passing through the adjusting blocks and into the die carriers, and an adjusting ring engaging each of the adjusting blocks and adapted to move the latter toward or from the center, substantially as described.

4. The combination of the head or chuck, the adjusting blocks, the die carriers engaged to the adjusting blocks by keys having angular heads which engage beveled recesses in the carriers, and an adjusting ring engaging each of the adjusting blocks and adapted to move the latter toward or from the center, substantially as described.

5. The combination of the chuck or head, the die carriers and adjusting blocks, said die carriers and adjusting blocks being in contact with each other and both of them engaged to the head by tongue and groove connections, substantially as described.

6. The combination with the head or chuck provided with slots in its outstanding flange of the adjusting blocks each provided with a teat or projection which enters and slides in the slot in the head, and the operating key H passing through said projection, substantially as described.

7. The combination with the head or chuck, the sliding ring or collar F having slots $f'$ and the die carriers of the keys for holding the parts together, said keys provided with heads which enter and slide in the slots $f'$, substantially as described.

8. In a bolt threading machine the combination with the bolt carriage having pivoted jaws which engage the bolt of a movable rack-bar carried by the carriage, adapted when moved to engage the jaws and close them, and a pinion engaging said rack-bar and adapted to first move the rack-bar to engage the jaws and then move the carriage through the medium or the rack-bar, substantially as described.

9. In a bolt threading machine the combination of the bolt carriage having vertical pivoted jaws with depending ends, a rack-bar having a beveled end to enter between and spread said depending ends thereby closing the upper ends, and a pinion adapted to engage the rack-bar and move it, substantially as described.

10. The combination with the bolt carriage having pivoted jaws, a movable rack-bar on the carriage to engage said jaws and close them, and a pinion to actuate the rack-bar, of a stop on the frame of the machine adapted to engage the carriage and hold it until the jaws have been closed, said stop released by the movement of the rack-bar substantially as described.

11. The combination with the bolt carriage having pivoted jaws, a movable rack-bar on the carriage to engage the jaws and close them, and a pinion to actuate the rack-bar of a stop on the frame of the machine adapted to engage and hold the carriage until released said stop made adjustable, substantially as described.

12. The combination with the carriage the jaws, and stop-bar P having the beveled portion $p'$ of the rack-bar N² beveled as at $n$—$n'$, substantially as described.

13. The combination of the split nut each half provided with a pin or projection, the pivoted plate having eccentric slots in which the pins enter, the pin for engaging the plate in its abnormal position, the beveled projection on the frame adapted to engage the beveled portion on the pin and the spring to return the plate to its normal position, substantially as described.

In testimony whereof I sign this specification in the presence of two witnesses.

JEROME W. COOK,
*Administrator of the estate of Frank S. Cook, deceased.*

Witnesses:
A. P. LINN COCHRAN,
ROBERT C. RODGERS.